United States Patent [19]

Lewis

[11] Patent Number: 4,708,848

[45] Date of Patent: Nov. 24, 1987

[54] NICKEL/CHROME BASE SUPERALLOYS

[75] Inventor: Albert Lewis, Covina, Calif.

[73] Assignee: Glass Incorporated International, Chino, Calif.

[21] Appl. No.: 830,010

[22] Filed: Feb. 18, 1986

[51] Int. Cl.$^4$ ............................................. C22C 30/00
[52] U.S. Cl. ....................................... 420/585; 65/15;
65/374.12; 420/586
[58] Field of Search ...................... 420/582, 585, 586;
148/442; 65/15, 374.12

[56] References Cited

U.S. PATENT DOCUMENTS 4,203,748  5/1980  Battigelli et al. .................. 420/585

Primary Examiner—R. Dean
Attorney, Agent, or Firm—Boniard I. Brown

[57] ABSTRACT

A nickel/chrome-base alloy, particularly suitable for high temperature molten glass handling and forming apparatus, resistant to oxidation and possessing high rupture strength.

6 Claims, No Drawings

NICKEL/CHROME BASE SUPERALLOYS

BACKGROUND OF THE INVENTION

This invention relates to nickel-base alloys particularly suitable for high temperature molten glass environments.

In one of its more specific aspects, the invention relates to articles manufactured from the alloys, particularly articles made by casting for use in molten glass processing.

In certain glass applications, there is a need for alloys which possess high rupture strength and high oxidation resistance at high temperatures. Among such applications are those involved, for example, in the glass fiber industry, where filaments are produced by flowing molten glass through the peripheral walls of a chamber capable of rotating at high speeds. The chamber is known as a Spinner Disc. The filaments are formed through openings in the wall due to the centrifugal action to which the molten material is subjected when rotating the Spinner Disc.

The Discs are usually operated when spinning glass fibers at temperatures of about 1900° F. and rotational speeds of about 1400 RPM. Under these conditions, the alloy of this invention has been found to possess superior stress-rupture and creep properties and superior resistance to the molten glass environment to which it is subjected. This apparatus is described more particularly in U.S. Pat. No. 3,190,736 which issued on June 22, 1965, to Stanley Benner for a "Rotor For the Forming of Glass Filaments." This reference describes in detail the construction of a spinner disc and the manner of its use.

U.S. Pat. No. 3,881,918 which issued on May 6, 1975, to Darryl J. Costin and James B. Ford for a "Cobalt-Base Superalloy" contains an interesting and informative discussion of nickel and cobalt-base superalloys which have been found to be useful in high temperature corrosive and oxidizing environments. This reference discusses applications in jet engines and also in the chemical industries for the particular alloys discussed therein which are useful chiefly at temperatures of at least 2,000° F. Although the particular compositions in this reference are substantially different from those in the present invention, the discussion of the alloying procedures, properties and testing is of sufficient value that this particular patent is incorporated herein by reference in its entirety.

It is an object of this invention to provide a nickel-chrome base alloy having superior stress-rupture and creep properties, and an alloy which can be melted and cast, and which is particularly resistant to corrosion by molten glass.

Preferred compositions for the alloy are represented by the following approximate composition on a weight percent basis:

| ELEMENT | PREFERRED RANGE | SPECIFIC EXAMPLES |
| --- | --- | --- |
| Chromium | 24–27 | 25.62 |
| Nickel | 41–47 | 46.33 |
| Columbiun & Tantalum | 1.0–1.9 | 1.50 |
| Silicon | .75–1.50 | 0.80 |
| Carbon | .10–.50 | 0.40 |
| Maganese | less than 2.0 | 0.69 |
| Tungsten | 2.5–4.0 | 2.59 |
| Molybdenum | 2.5–4.0 | 3.49 |
| Cobalt | 2.5–4.0 | 3.89 |
| Phosphorus | less than .03 | 0.006 |
| Zirconium | 0.0–0.30 | |
| Lead | less than .025 | |
| Tin | less than .025 | |
| Copper | less than .50 | |
| Iron | Balance | Balance |

The above compositions are not meant to preclude the presence of impurities which are inherently contained in the principal components previously set forth. However, the amount of an individual impurity should be limited to less than about 0.1 weight percent of the total.

The compositions of this invention can be prepared by melting and casting according to recognized procedures for nickel-base alloys, sometimes known as high temperature alloys. The melt components are used in such a way to facilitate the melting of the high melting point elements such as chromium, tantalum, etc.

However, an alternate method of producing the alloy, the original melt formed in the crucible will consist principally of chromium and nickel. Thereafter, the remainder of the elements required can be introduced into the original melt in any order when the melt temperature is within the range of from about 2700° to about 2800° F. The preferred method of producing the alloy is to add all components of the composition to the crucible at the same time. The resulting castings can be welded and machined by conventional techniques. Preferably, the cast alloy will be heat treated at 2150° for 4 hours and then air cooled prior to further operation.

I claim:

1. High temperature, load-bearing oxidation resistant castings, said castings being fabricated from an alloy consisting essentially of:

| ELEMEMTS | % BY WEIGHT |
| --- | --- |
| Chromium | 24–27 |
| Nickel | 41–47 |
| Columbium & Tantalum | 1.0–1.9 |
| Silicon | .75–1.5 |
| Carbon | .10–.50 |
| Manganese | less than 2.0 |
| Tungsten | 2.5–4.0 |
| Molybdenum | 2.5–4.0 |
| Cobalt | 2.5–4.0 |
| Phosphorus | less than .03 |
| Zirconium | 0–0.30 |
| Lead | less than 36 PPM |
| Nitrogen | less than 150 PPM |
| Tin | less than 25 PPM |
| Oxygen | less than 50 PPM |
| Copper | less than .50 |
| Iron | Balance | wherein the alloy posseses high temperature stress rupture strength and oxidation resistance.

2. High temperature, load-bearing oxidation resistant castings, said castings being fabricated from an alloy consisting essentially of:

| ELEMENTS | % BY WEIGHT |
| --- | --- |
| Chromium | 25.62 |
| Nickel | 46.33 |

-continued

| ELEMENTS | % BY WEIGHT |
| --- | --- |
| SIlicon | 0.80 |
| Carbon | 0.40 to 0.25 |
| Manganese | 0.69 |
| Tungsten | 2.59 |
| Molybdenum | 3.49 |
| Cobalt | 3.89 |
| Phosphorus | 0.006 |
| Zirconium | — |
| Iron | Balance |
| Oxygen | 50 PPM (max) |
| Nitrogen | 150 PPM (max) |
| Tin | 25 PPM (max) |
| Lead | 36 PPM (max) | and a component selected from the group consisting of Columbium and Tantalum and mixtures thereof of about 1.50% by weight wherein the alloy possesses high temperature stress rupture strength and oxidation resistance.

3. High temperature, load-bearing oxidation resistant castings, said castings being fabricated from an alloy consisting essentially of:

| ELEMENTS | % BY WEIGHT |
| --- | --- |
| Chromium | 25.62 |
| Nickel | 46.33 |
| Silicon | 0.75 |
| Carbon | 0.35 |
| Manganese | — |
| Tungsten | 4.50 |
| Molybdenum | — |
| Cobalt | 3.89 |
| Phosphorus | 0.006 |
| Zirconium | 0.30 |
| Iron | Balance |
| Oxygen | 50 PPM (max) |
| Nitrogen | 150 PPM (max) |
| Tin | 25 PPM (max) |
| Lead | 36 PPM (max) | and a component selected from the group consisting of Columbium and Tantalum and mixtures thereof of about 1.80% by weight wherein the alloy possesses high temperature stress rupture strength and oxidation resistance.

4. The casting of claim 1 wherein the casting is a spinner disc used in the formation of glass fibers.

5. The casting of claim 2 wherein the casting is a spinner disc used in the formation of glass fibers.

6. The casting of claim 3 wherein the casting is a spinner disc used in the formation of glass fibers.

* * * * *